(12) United States Patent
Soni et al.

(10) Patent No.: US 7,769,739 B1
(45) Date of Patent: Aug. 3, 2010

(54) SEARCHING FOR AN ITEM USING AN ACCESSING APPLICATION AS A SEARCH PARAMETER

(75) Inventors: Sachin Soni, New Delhi (IN); Anmol Dhawan, Ghaziabad (IN); Sachin Gaur, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 243 days.

(21) Appl. No.: 11/650,659

(22) Filed: Jan. 8, 2007

(51) Int. Cl.
*G06F 7/00* (2006.01)
(52) U.S. Cl. .................. 707/706; 707/705; 707/713; 707/715
(58) Field of Classification Search .............. 707/1, 707/2, 3, 4, 5, 6, 999.001, 999.002, 999.003, 707/999.004, 999.005, 999.006
See application file for complete search history.

(56) References Cited

U.S. PATENT DOCUMENTS 7,437,358 B2 * 10/2008 Arrouye et al. ............... 707/4

2005/0289109 A1 * 12/2005 Arrouye et al. ............... 707/1

OTHER PUBLICATIONS

*Finder: Everything you need, just a click away.*, <http://www.apple.com/macosx/features/finder/> (visited on Feb. 27, 2007).
*Mac 101: The Finder*, <http://docs.info.apple.com/article.html?artnum=304725> (visited on Feb. 27, 2007).
*Spotlight: Find anything, anywhere, fast.*, <http://www.apple.com/macosx/features/spotlight/> (visited on Feb. 27, 2007).
*Tiger Developer Overview Series: Working with Spotlight*, <http://developer.apple.com/macosx/spotlight.html> (visited Feb. 27, 2007).
*How Does Spotlight Work?*, <http://developer.apple.com/documentation/Carbon/Conceptual/MetadataIntro/Concepts/HowDoesItWork.html> (visited on Feb. 27, 2007).

* cited by examiner

*Primary Examiner*—Hung Q Pham
(74) *Attorney, Agent, or Firm*—Robert C. Kowert; Meyertons, Hood, Kivlin, Kowert & Goetzel, P.C.

(57) ABSTRACT

Searching for an item using an accessing application as a search parameter is described, including receiving a search query to perform a search for an item, the search query having at least an accessing application that has accessed the item, searching for the item using the search query, and presenting a search result based on the search.

24 Claims, 7 Drawing Sheets

| File Name | Date of Access | Application |
|---|---|---|
| ABC.x | 4/15/2006, 10/25/2006 | Application A |
| ABC1.x | 11/05/2006 | Application A |
| ABC2.x | 3/12/2006 | Application A |
| ABC3.x | 10/25/2006 | Application B |
| DEF.x | 1/1/2006 | Application A |
| DEF1.x | 8/16/2006 | Application A |
| DEF1.x | 12/16/2004 | Application B |

SEARCHING FOR AN ITEM USING AN ACCESSING APPLICATION AS A SEARCH PARAMETER

FIELD OF THE INVENTION

The present invention relates generally to software. More specifically, searching for an item using an accessing application as a search parameter is described.

BACKGROUND OF THE INVENTION

Computer systems may include storage for storing items generated by a system. The storage may be local, remote, or a combination of the two. For example, the items may be stored on a local or networked hard drive, flash drive, or optical drive. Items may be, for example, files or other data structures. The items may include files that have been downloaded or otherwise received by a system without being created or modified by a user.

Conventionally, a computer system may store tens of thousands of items, many of which may have similar names and are stored using a large and confusing directory structure. A user looking for a specific file may search for the file by specifying a name of the file or another identifying attribute, such as a file type or a date of file creation. The search may be lengthy and consume large amounts of system resources, thereby slowing system response. Additionally, a user may be unable to provide an adequate search request based on the attributes associated with the item that the user remembers.

Thus, what is needed is a storage searching process without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links.

In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, searching for an item using an accessing application as a search parameter is described. A search may be performed using, for example, a search window or other device or routine that may receive a search query to search for an item. The search query may include various search parameters and may be used to determine the scope of the search. A search parameter may be anything that may be used to limit the scope of a search. For example, a search parameter may be a name of a file, a size of a file, or a location of a file. An item may be anything that may be searched for using a search engine, such as a file or other data structure. According to an example, the search query may include, as a search parameter, at least an accessing application that has opened or accessed the item. An accessing application may be any program or routine that has been executed and accessed an item. An item may be accessed when, for example, the application has opened the item, or when the application has performed some action to access the item, for example to preview the item or perform a search of the item's contents. In some examples, the accessing application may not have modified the item. Once the search query has been received, the item may be searched for, and a search result may be presented. The search result may include one or more items that match the search query. In other examples, a search result may not include any items that match the search query. According to another example, a list corresponding to the accessing application may be maintained. The list may include items that have been accessed or opened by the accessing application. In still other examples, the list may be parsed to perform the searching. Parsing may include reviewing the items on the list to determine whether the items match the search query. Further, the list may be compiled when items are accessed or opened by the accessing application.

Search Window

Figure 1A:
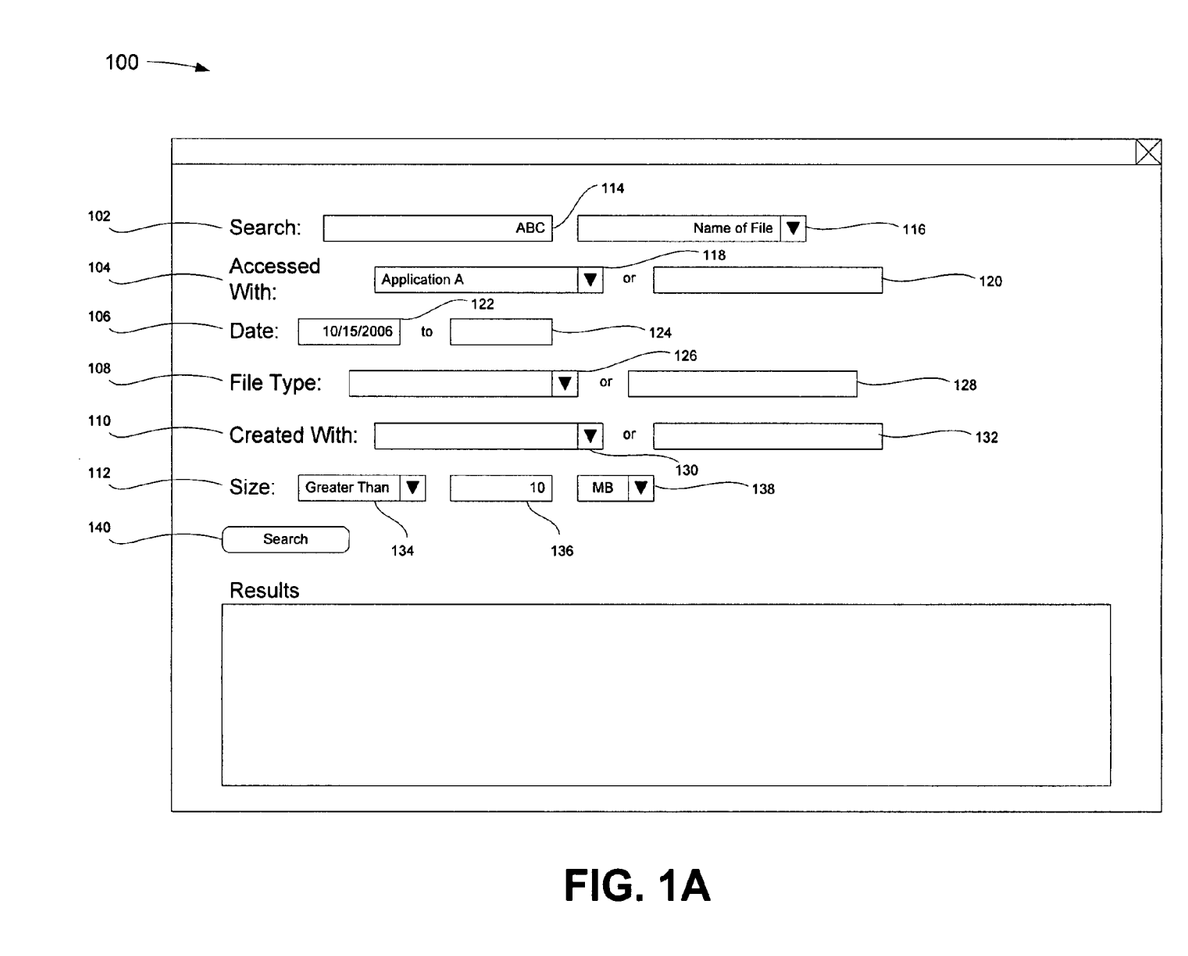
FIGS. 1A and 1B illustrate a search window according to various examples.
Figure 1B:
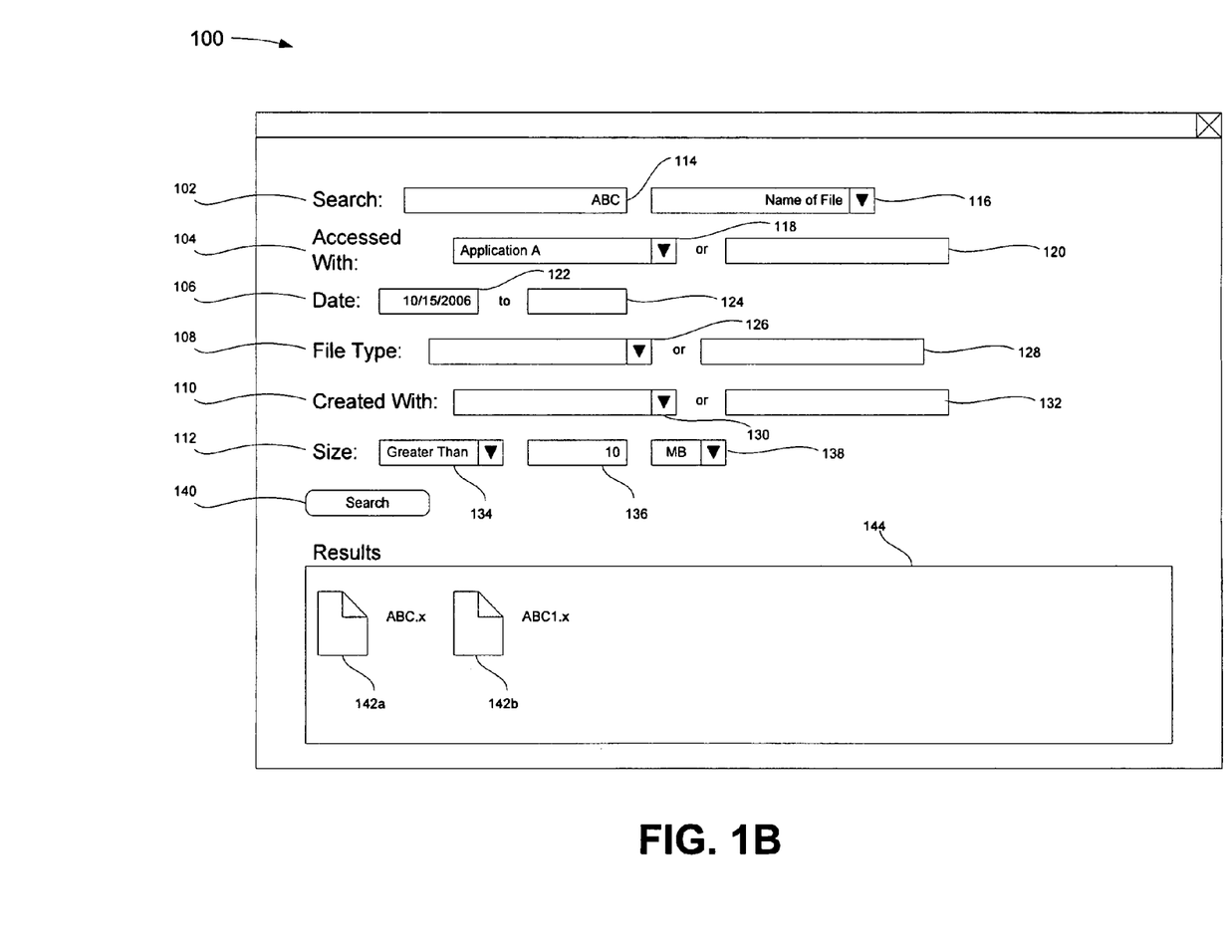

FIGS. 1A and 1B illustrate a search window 100 according to various examples. FIG. 1A illustrates the search window 100 including search parameters that have been entered by a user. FIG. 1B illustrates the search window 100 after a user has executed a search. The search window 100 may be used to initiate a search of items in a storage device such as a local or networked drive or volume. For example, the storage device may include the data stored on a user's hard drive such as one or more files. The search window 100 may be presented to a user and may display various graphical elements to allow a user to choose search parameters for the search query. The search window 100 may be part of another program such as a word processor or other application, or the search window 100 may be a standalone program used by several applications.

According to various examples, a search may be performed by a user using the search window 100. The search may search for an item such as a file and performed using a search query provided by a user. The search query may include various search parameters including an accessing application that has accessed (e.g., opened) the item. For example, a user may indicate that he wishes to search for a file accessed by Application A. The user may specify the accessing application in the search window 100 and search results may be displayed in response to the search query.

In some examples, the search window 100 may be used to form a search query and display search results. The search query may include various parameters, such as an item name 102, an accessing application 104 (e.g., an application used to open the item), a date range 106 during which the item was accessed, a file type 108 of the item, an application 110 used to create the item, and a size 112 of the item.

The item name 102 may be a file name, for example, which may be entered in a text box 114. A pull-down menu 116 may be used to select a type of item name. For example, the text box 114 may include a string to be searched for in a name of a file, or may include a string to be searched for in the contents of a file. Additional text boxes may be used to add search terms. For example, an additional text box may be added to search for one string in the name of a file and to search for another string in the contents of the file. Additionally, wild cards (e.g., *) and Boolean search terms (e.g., AND, OR, &&, ==) may also be used in the text box 114.

The accessing application 104 with which the item was accessed may be specified using a pull-down menu 118 or a text box 120. For example, a user may wish to search for files that have been accessed by Application A. The user may select Application A from the pull-down menu 118. The pull-down menu 118 may include, for example, a list of applications such as those that are associated with Multipurpose Internet Mail Extensions (MIME). The user may also type the name of an application into the text box 120. The accessing application 104 search parameter may be useful when a user knows that he has opened or otherwise accessed a file (or other item) with an application. For example, a user may have opened a file, but not modified the file, because the file may be a portable document or image that is from the Internet, and intended to be "read-only" (i.e., non-modifiable).

The user may specify a date range 106. The date range 106 may include a beginning date 122 and an end date 124. If either the beginning date 122 or the end date 124 is left empty, a search may be open ended. For example, as shown here, the search window 100 may be used to search for items accessed after Oct. 15, 2006. The date range 106 may be tied to the accessing application 104 which was used to access the item, or may also be tied to other search parameters. According to another example, the date range 106 may be tied to when an item was created or modified.

The file type 108 of the item may be specified using a pull-down menu 126. For example, the pull-down menu 126 may include a list of MIME-registered file types on a computer system. The file type 108 of an item may be indicated by an extension of a file, for example. File types may include joint photographic experts group (JPEG) files, portable document format (PDF) files, graphics interchange format (GIF) files, DOC (Microsoft® Word®) files, and various other file types. The pull-down menu may list the type of file, an extension of the file, a combination of the two, or any indication of a file type. A user may also enter a file type into a text box 128.

In some examples, the fields of search window 100 may be filled, completed, or otherwise used. For example, the "Created With" parameter 110 may be entered using a pull-down menu 130 that may include MIME-registered or other applications. The "Created With" parameter 110 may also be manually entered into a text box 132. The "Created With" parameter 110 may be used when a user knows the program with which the item was created. For example, a user may know that a file was created with Application A, and the user may be able to limit the search to files created by Application A.

In some examples, the size parameter 112 may be filled using a pull-down menu 134, a text box 136, and a pull-down menu 138. The text box 136 may be used to indicate a desired size. The pull-down menu 134 may be used to specify whether the specified size is greater than, less than, equal to, or has any other relationship to the searched items. As another example, the pull-down menu 138 may be used to specify the unit of measurement for the size specified in the text box 136, for example kilobytes (KB) or megabytes (MB).

Although certain search parameters are described here, it is understood that various other search parameters may be used in place of or in addition to those described here. For example, additional search parameters may include a date of item creation or date of modification. Additionally, the accessing application 104 may be an opening application that has opened an item.

Once a user has specified the search query to search for the item, the user may select a search button 140 to initiate the search. FIG. 1B illustrates search results 142 in a result pane 144 according to various examples. The search results 142 are examples of search results that may be found in a list of items accessed by an application (e.g., Application A). The list is described further regarding FIGS. 2A and 2B.

According to an example, when a user searches for the string 'ABC' in the name of a file accessed with Application A after Oct. 15, 2006, two results, 142a and 142b, are returned. The results are indicated with the extension ".x" as files that were accessed with Application A, including the string 'ABC' in their name. When the results 142 are shown in the pane 144, a user may open or manipulate the results 142. Search for items using an accessing application as a search parameter may allow a user to produce useful search results when a user may remember opening and viewing an item, for example, but may not have created or modified the item.

Lists of Items Accessed by an Application

Figure 2A:
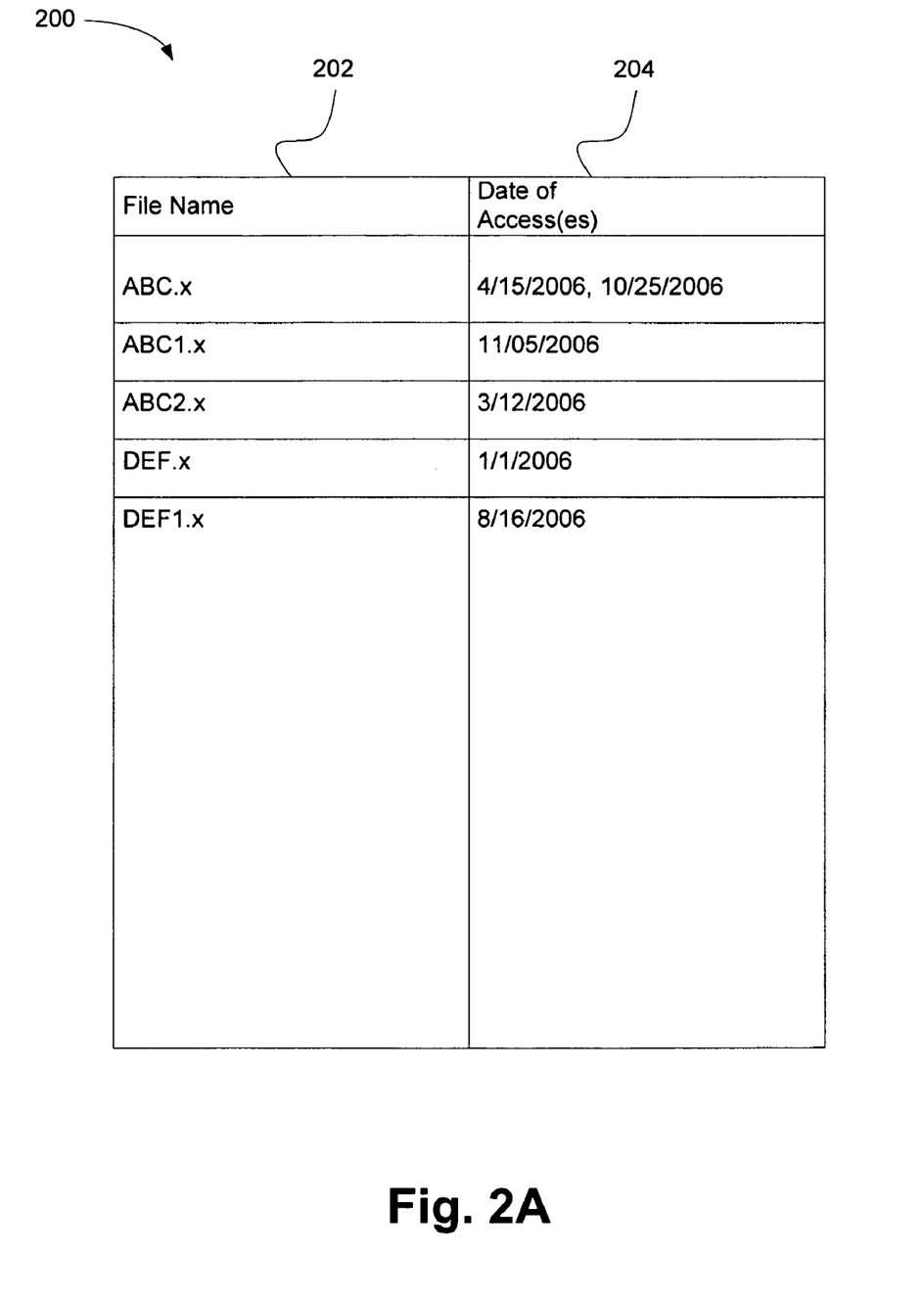
FIGS. 2A and 2B illustrate lists associated with an application used to perform a search according to various examples.
Figure 2B:
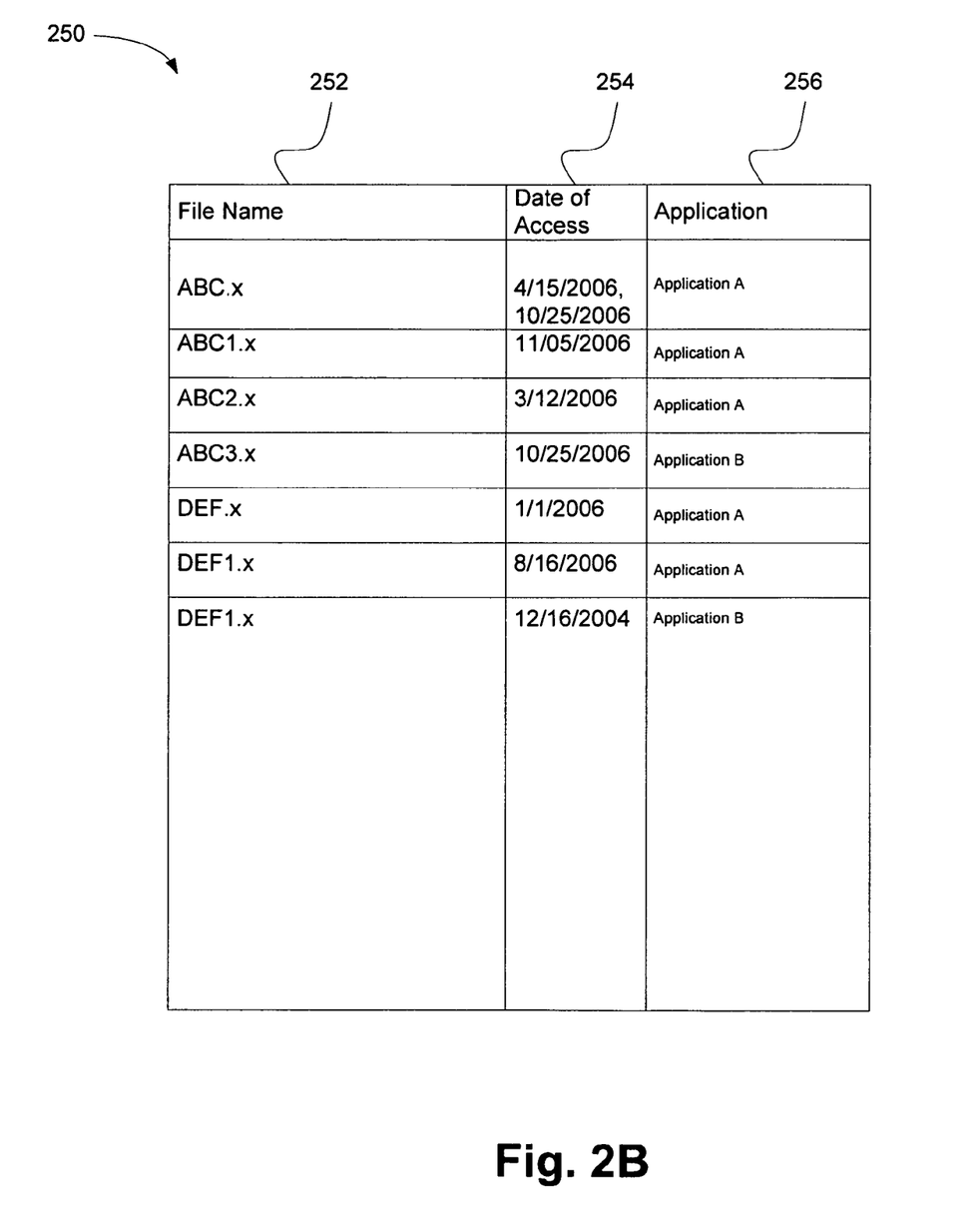

FIGS. 2A and 2B illustrate lists associated with an application used to perform a search according to various examples. FIG. 2A illustrates a list 200 associated with an application, for example Application A, and FIG. 2B illustrates a list 250 that may be used with multiple applications.

A list may be maintained that includes items that have been accessed by one or more applications. The list may be compiled when the applications access the items, for example. When a user requests a search including a search parameter that depends on whether an application has accessed an item, the search may be performed by parsing the list for the requested item. According to various examples, this may provide quick and efficient searches, since the list contains a limited number of items that have been accessed by applications. Searches that do not use an application that has accessed or opened an item as a search parameter may use other search techniques (e.g., searching a directory structure for a file, and others).

The list 200 may be used where, for example, an application maintains the list 200 of items (e.g., files) that have been accessed using the application. The list 200 may be associated with a single application (e.g., Application A). In some examples, if the list 200 is associated with Application A, the application may add an entry to the list each time an item is accessed. According to an example, the list 200 may add a new entry only when an item not on the list is accessed. If an item being accessed already appears on the list 200, the application may add another access to the time of access column, as described below in greater detail in connection with FIG. 4.

In some examples, the list 200 may include a name column 202 and a time of access column 204. The name column 202 may contain the name of an item, such as a file that has been accessed by the application. The time of access column 204 may include an entry for each time the file has been accessed by the application, an entry for only the most recent access, or entries for a limited number of accesses. Various other types of information may also be included in the list 200, such as sizes of items and applications with which the items were created.

If a search were performed using the search window 100 with the search parameters shown in FIG. 1A, for example, the search results 144 may include ABC.x and ABC1.x. Both ABC.x and ABC1.x are on the list 200 of files accessed by Application A, both include the string 'ABC' in their name, and both were accessed sometime after Oct. 15, 2006. Although ABC2.x is on the list 200 and includes the string 'ABC' in its name, it was last accessed prior to Oct. 15, 2006 and, therefore, does not appear among the search results 144. The other items of the list 200 do not include the string 'ABC' and, therefore, also do not appear among the search results 144.

In some examples, the list 250 includes a name column 252, a time of access column 254, and an application column 256. The name column 252 includes the names of the items and the time of access column 254 includes the times when those items were opened. The application column 256 includes the application that was used to access the item. As an example, the list 250 may be used with more than one application. For example, both Applications A and B may have accessed items and may have entries in the list 250.

Using the search parameters as shown in FIG. 1A, a user may use the search window 100 to search the list 250. For example, the search window 100 may first search for items accessed using Application A. The search window 100 may then search for items with names including the string 'ABC' and accessed after Oct. 15, 2006. The search window 100 would return the search results 144 ABC.x and ABC2.x. The search window 100 would not return the item ABC3.x, even though the name includes the string 'ABC' and it was accessed after Oct. 15, 2006 since the item ABC3.x was accessed using Application B, and not Application A.

Here, the item DEF1.x appears twice in the list 250. The item DEF1.x has been accessed using both Application A and Application B. As a result, two entries, one for Application A and one for Application B appear in the list 250. In some examples, if Application C were to access the item DEF1.x, a third entry would be made for Application C and the item DEF1.x. However, if Application A were to access the item DEF1.x again, no new entry would be made, although the existing entry for Application A and the item DEF1.x may be updated.

Process for Searching for an Item

Figure 3:
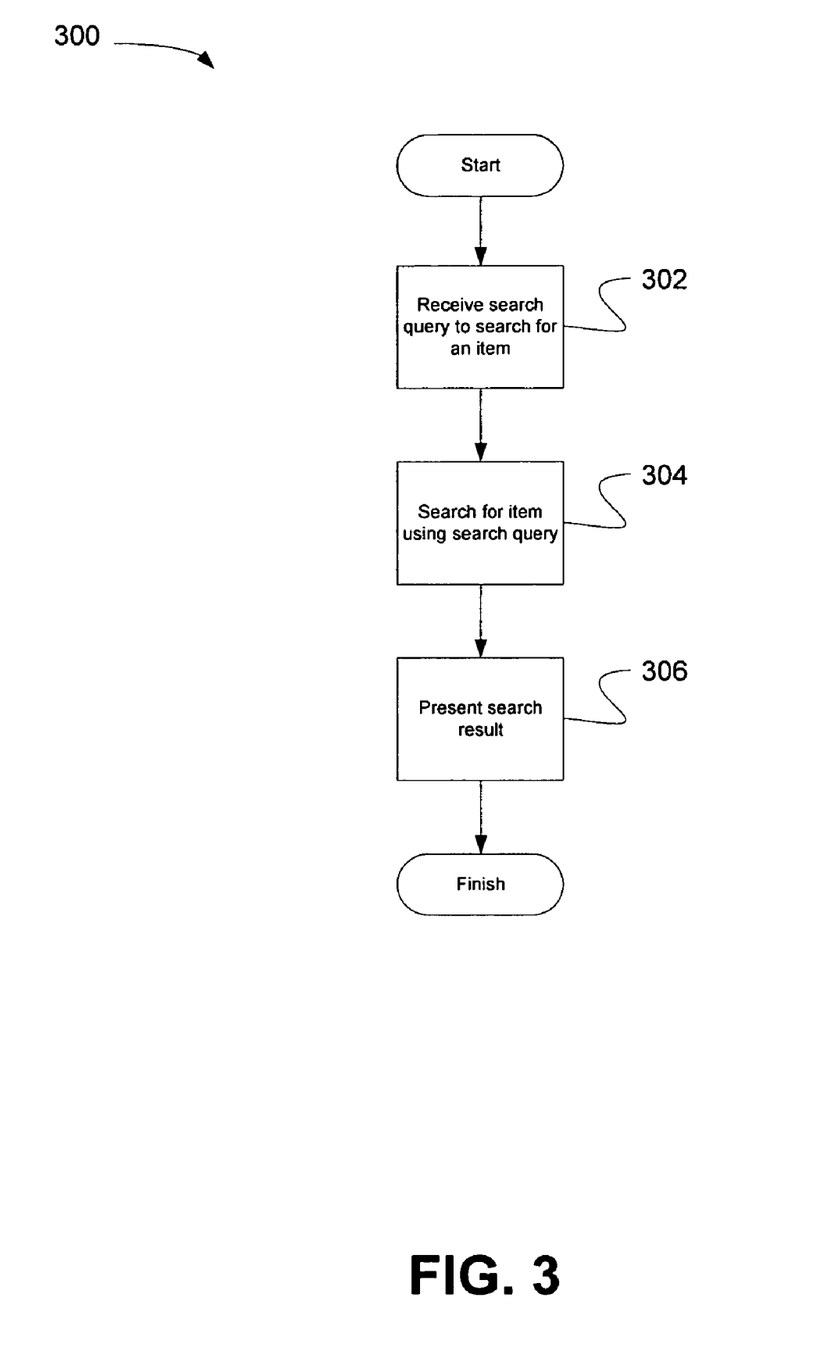
FIG. 3 is a flowchart describing a process for searching for an item using an accessing application as a search parameter according to various examples.

FIG. 3 is a flowchart describing a process 300 for searching for an item using an accessing application as a search parameter according to various examples. In operation 302, a search query to search for an item is received. The search query includes at least an accessing application that has accessed the item. The accessing application may be an application, such as those described above regarding FIGS. 2A-2B that may be associated with a list such as the lists 200 and 250. The search query may also include a portion of a content of the item that may include any information, data, parameters, criteria, rules, or the like that may be used to identify the item. For example, an entire item name or a portion thereof may be used. Further, the entire content of an item or a portion thereof may also be used.

In operation 304, the item may be searched for using the search query. The searching may include parsing a list of items accessed by the application and returning a search result based on the parsing. For example, the lists 200 or 250 may be parsed to find searched-for items based on the search query including an application that has accessed the item.

In operation 306, a search result is presented based on the search. The search result may include one or more items that match the search parameters of the search query, such as the search results 142. Alternatively, the search result may include no items if there are no items matching the search query. In other examples, the search result may be displayed or communicated to a user in a variety of ways such as using the search pane 144.

Process for Compiling Lists

Figure 4:
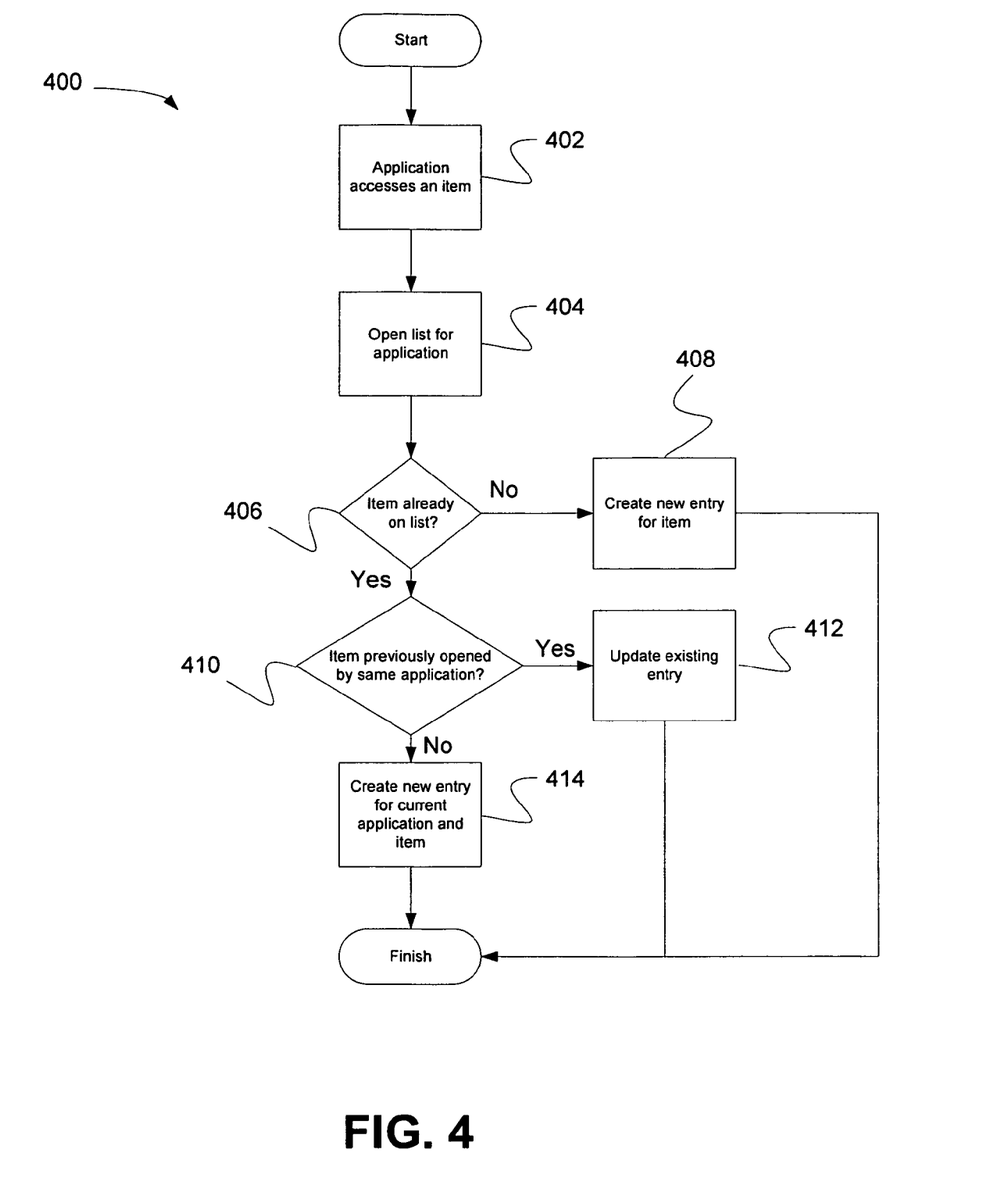
FIG. 4 is a flowchart describing a process for compiling a list of items by accessing application according to various examples.

FIG. 4 is a flowchart describing a process 400 for compiling a list of items by accessing an application, according to various examples. The process 400 may be used to compile the lists 200 and 250, for example.

In operation 402, an application accesses an item. The application may have accessed the item in response to a user input or at the behest of another application or system process. According to an example, entries may be added to the list only when a user causes an application to access an item, so that the user may make subsequent searches for items that the user remembers opening with certain applications.

In operation 404, in response to the application accessing the item, a list for the application is opened. The list may be a list for a single application (e.g., the list 200), or a list that is used with multiple applications (e.g., the list 250).

In operation 406, it is determined whether the item being accessed by the application is already on the list. If the item is not on the list, in operation 408, a new entry may be created for the item. The new entry may include a name of the item, a time of access to the item, and the application name if the list is a multiple application list. If the item is on the list, in operation 410, it is determined whether the entry indicates that the item was accessed by the same application that is accessing it now. Operation 410 may be optional, for example if the list is a single application list such as the list 200.

If it is the same application, in operation 412, the existing entry of the item may be updated. For example, a new time of access may be added to the entry. According to some examples, the operation 412 may be optional and the entry may not be updated. If the application accessing the item is different from the application in the existing entry, a new entry may be created in operation 414. The new entry may include the name of the item and the name of the application currently accessing the item, along with the current time of access.

An Exemplary Computer System

Figure 5:
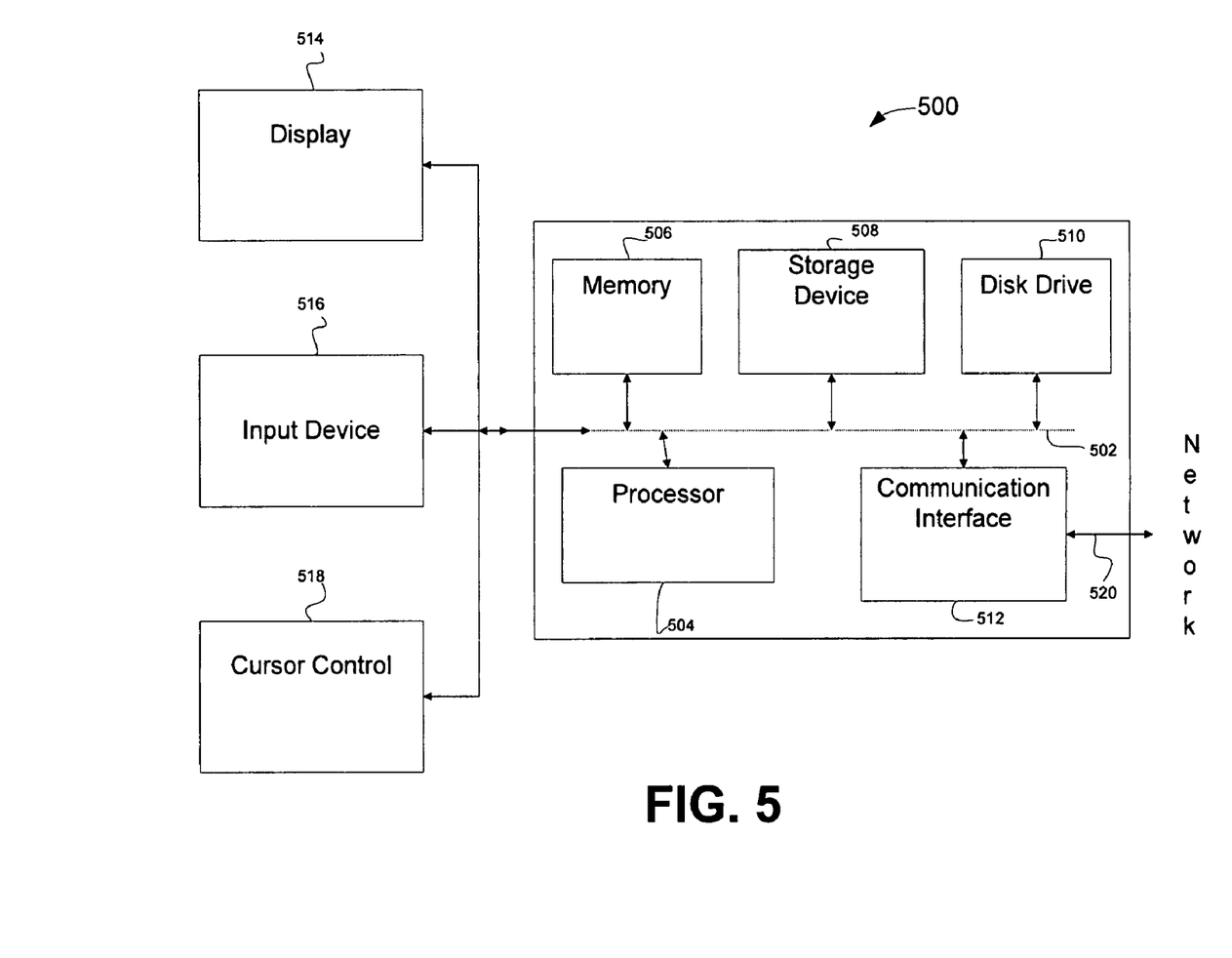
FIG. 5 is a block diagram illustrating an exemplary computer system suitable for searching for an item using an accessing application as a parameter, in accordance with various examples.

FIG. 5 is a block diagram illustrating an exemplary computer system suitable for searching for an item using an accessing application as a parameter, in accordance with various examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed is:

1. A method, comprising:
providing, by a computer, a search interface comprising an accessing application search parameter field and a file type search parameter field, wherein the search interface allows an accessing application search parameter and a file type search parameter to be specified separately, and wherein the search interface allows both the accessing application search parameter and the file type search parameter to be specified for a search query;
receiving a search query via the provided search interface to perform a search for an item, the search query comprising at least an indication of an accessing application;
searching for the item using the search query including the indication of the accessing application, wherein said searching for the item comprises:
selecting a list of items, from among a plurality of lists of items, wherein the selected list comprises a listing of items accessed by the accessing application as indicated in the received search query, wherein each of the plurality of lists of items corresponds to a different accessing application, and each list comprises a listing of items accessed by its respective accessing application; and
parsing the selected list of items to find one or more items that correspond to the received search query; and
presenting, by the computer, a search result based on the parsing.

2. The method of claim 1, wherein the search query further comprises at least a portion of a content of the item.

3. The method of claim 2, wherein the content of the item comprises a name of the item.

4. The method of claim 1, further comprising compiling the list of items when an accessing application accesses an item.

5. The method of claim 4, further comprising:
determining whether an entry for a given item is on the list of items when an accessing application accesses the given item;
updating the entry if the given item is on the list of items; and
adding an entry to the list of items if the given item is not on the list of items.

6. The method of claim 5, further comprising adding the entry to the list of items if another entry on the list of items is associated with the given item as accessed by another accessing application.

7. The method of claim 1, wherein the item comprises a file.

8. The method of claim 1, wherein receiving the search query further comprises receiving a date range during which the item was accessed.

9. The method of claim 1, wherein the accessing application as indicated in the received search query comprises an application that has opened the item.

10. A method, comprising:
receiving, by a computer, a search query to search for an item, the search query comprising at least an indication of an accessing application, wherein the accessing application is an application that has previously accessed the item on the computer;
in response to said receiving the search query:
selecting a list of items, from among a plurality of lists of items, wherein the selected list of items comprises a listing of items accessed by the accessing application as indicated in the received search query, wherein each of the plurality of lists of items corresponds to a different accessing application, and each list comprises a listing of items accessed by its respective accessing application;
opening the selected list of items accessed by the accessing application as indicated in the received search query;
parsing the selected list of items to find one or more items that correspond to the received search query; and
presenting, by the computer, a search result based on the parsing.

11. The method of claim 10,
wherein the received search query comprises a search parameter;
wherein the search result comprises at least one item if the at least one item is listed in the selected list of items and the at least one item satisfies the search parameter.

12. The method of claim 11, wherein the search parameter comprises a name of the item.

13. The method of claim 10, further comprising compiling the list of items when an accessing application accesses an item.

14. A system, comprising:
a memory configured to store a search result; and
a processor configured to communicate with the memory and further configured to wherein during operation the processor performs:
receiving a search query to search for an item, the search query comprising at least an indication of an accessing application, wherein the accessing application is an application that has previously accessed the item;
in response to said receiving the search query:
selecting a list of items, from among a plurality of lists of items, wherein the selected list of items comprises a listing of items accessed by the accessing application as indicated in the received search query, wherein each of the plurality of lists of items corresponds to a different accessing application, and each list comprises a listing of items accessed by its respective accessing application;
opening the selected list of items accessed by the accessing application as indicated in the received search query;
parsing the selected list of items to find one or more items that correspond to the received search query; and
presenting a search result based on the parsing.

15. The system of claim 14, the processor being further configured to compile the list of items when an accessing application accesses an item.

16. The system of claim 15, the processor being further configured to:
determine whether an entry for a given item is on the list of items when an accessing application accesses the given item;
update the entry if the given item is on the list of items; and add an entry to the list of items if the given item is not on the list of items.

17. The system of claim 14, wherein the item comprises a file.

18. A computer readable medium storing program instructions executable by a computer to implement:

providing a search interface comprising an accessing application search parameter field and a file type search parameter field, wherein the search interface allows an accessing application search parameter and a file type search parameter to be specified separately, and wherein the search interface allows both the accessing application search parameter and the file type search parameter to be specified for a search query;

receiving a search query via the provided search interface to perform a search for an item, the search query comprising at least an indication of an accessing application;

searching for the item using the search query including the indication of the accessing application, wherein said searching for the item comprises:

selecting a list of items, from among a plurality of lists of items, wherein the selected list comprises a listing of items accessed by the accessing application as indicated in the received search query, wherein each of the plurality of lists of items corresponds to a different accessing application, and each list comprises a listing of items accessed by its respective accessing application; and parsing the selected list of items to find one or more items that correspond to the received search query; and presenting a search result based on the parsing.

19. The computer readable medium of claim 18, the program instructions further executable by the computer to implement compiling the list of items when an accessing application accesses an item.

20. The computer readable medium of claim 19, the program instructions further executable by the computer to implement:

determining whether an entry for a given item is on the list of items when an accessing application accesses the given item;

updating the entry if the given item is on the list of items; and adding an entry to the list of items if the given item is not on the list of items.

21. The computer readable medium of claim 18, wherein the item comprises a file.

22. A computer readable medium storing program instructions executable by a computer to implement:

receiving a search query to search for an item, the search query comprising at least an indication of an accessing application, wherein the accessing application is an application that has previously accessed the item on the computer; and in response to said receiving the search query:

selecting a list of items, from among a plurality of lists of items, wherein the selected list of items comprises a listing of items accessed by the accessing application as indicated in the received search query, wherein each of the plurality of lists of items corresponds to a different accessing application, and each list comprises a listing of items accessed by its respective accessing application;

opening the selected list of items accessed by the accessing application as indicated in the received search query;

parsing the selected list of items to find one or more items that correspond to the received search query; and presenting a search result based on the parsing.

23. The computer readable medium of claim 22, the program instructions further executable by the computer to implement:

determining whether an entry for a given item is listed on the list of items when an accessing application accesses the given item;

updating the entry if the given item is on the list of items; and adding an entry to the list of items if the given item is not on the list of items.

24. The computer readable medium of claim 23, wherein the adding the entry for the given item to the list of items further comprises adding a date or time at which the accessing application accessed the given item.

* * * * *